(12) United States Patent
Sakatani et al.

(10) Patent No.: US 6,830,741 B1
(45) Date of Patent: Dec. 14, 2004

(54) TITANIUM-OXIDE AND PHOTOCATALYST AND PHOTOCATALYST COATING COMPOSITION

(75) Inventors: Yoshiaki Sakatani, Niihama (JP); Hiroyuki Ando, Niihama (JP); Hironobu Koike, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 77 days.

(21) Appl. No.: 09/697,309

(22) Filed: Oct. 27, 2000

(30) Foreign Application Priority Data

Oct. 29, 1999 (JP) .......................................... 11-310250
Feb. 24, 2000 (JP) ....................................... 2000-047295

(51) Int. Cl.[7] .......................................... C01G 23/047
(52) U.S. Cl. ....................................... 423/610; 502/350
(58) Field of Search ................................ 423/609, 610; 502/350

(56) References Cited

U.S. PATENT DOCUMENTS

| | | | |
|---|---|---|---|
| 2,962,353 A | 11/1960 | Haimsolm et al. | |
| 3,676,362 A | 7/1972 | Yates | |
| 4,046,790 A | * 9/1977 | Armor et al. | ............... 502/155 |
| 4,313,021 A | * 1/1982 | Ryu | ............................ 585/463 |
| 5,011,674 A | 4/1991 | Yoshimoto et al. | |
| 6,107,241 A | 8/2000 | Ogata | |
| 6,306,796 B1 | 10/2001 | Suzue et al. | |
| 6,429,169 B1 | 8/2002 | Ichinose | |
| 6,627,579 B1 | 9/2003 | Sakatani et al. | |

FOREIGN PATENT DOCUMENTS

| | | |
|---|---|---|
| DE | 41 23 772 A1 | 1/1993 |
| EP | 0 737 513 A1 | 10/1996 |
| EP | 0 774 443 A1 | 5/1997 |
| EP | 1 027 924 A1 | 8/2000 |
| EP | 1 065 169 A1 | 1/2001 |
| EP | 1 125 636 A1 | 8/2001 |
| EP | 1254863 A1 | 11/2002 |
| GB | 427339 | 4/1935 |
| JP | 09-71418 A | 3/1997 |
| JP | 11-333304 | 12/1999 |
| WO | WO 00/10706 | 3/2000 |

OTHER PUBLICATIONS

Partial English Translation of JP–11–333304–A.
Anpo et al., "Photoformation and Structure of $O_2^-$ and Nitrogen–Containing Anion Radicals Absorbed on Highly Dispersed Titanium Oxide Anchored onto Porous Vycor Glass", J. Phys. Chem. 89, pp. 5689–5694.
Chem. Phys. Lett., vol. 123, No. 1,2, Jan. 3, 1986, Shinri Sato, Photocatalytic Activity of $No_x$—Doped $TiO_2$ in the Visible Light Region, pp. 126–128.
Z. Naturforsch. 36A, 226–232 (1981) no month.
The Chemical Society of Japan No. 8 (1986), pp. 1084–1090, and the English translation thereof no month.
Journal of Colloid and Interface Science, vol. 35, No. 3, (1971), pp. 424–433 no month.
Chem. Phys. Lett., vol. 8, No. 1 (1971), pp. 45–48 no month.

\* cited by examiner

*Primary Examiner*—Stanley S. Silverman
*Assistant Examiner*—Edward M. Johnson
(74) *Attorney, Agent, or Firm*—Fitch Even Tabin & Flannery

(57) ABSTRACT

A titanium oxide showing sufficiently high photocatalytic activities by irradiation of visible light is provided. Using the titanium oxide, an excellent photocatalyst and photocatalyst coating composition is also provided. The titanium oxide has (i) three or more peaks within the range of from 1.930 to 2.030 in g value of electron spin resonance spectrum of the titanium oxide, wherein the largest one of the peaks is within the range of from 1.990 to 2.020 in the g value and/or (ii) a spin concentration X of $1.50 \times 10^{16}$ spins/g or more, which is determined from electron spin resonance spectrum of the titanium oxide measured after irradiation of visible light.

6 Claims, 3 Drawing Sheets

US 6,830,741 B1

TITANIUM-OXIDE AND PHOTOCATALYST AND PHOTOCATALYST COATING COMPOSITION

FIELD OF THE INVENTION

The present invention relates to a titanium oxide, to a photocatalyst using the titanium oxide and to a photocatalyst coating composition using the titanium oxide.

BACKGROUND OF THE INVENTION

Ultraviolet irradiation to a semiconductor generates electrons having a strong reduction activity and positive holes having a strong oxidation activity, to decompose a molecular species that comes in contact with the semiconductor by an oxidation-reduction activity. Such an activity is called a photocatalytic activity. By the photocatalytic activity, $NO_x$ in the atmosphere is decomposed, bad-smelling substances, molds or the like in a living or working space are decomposed and removed, environmental pollution substances such as organic solvents, agrochemicals and surfactants in water are decomposes and removed. As a substance showing the photocatalytic activity, titanium oxide is attracting much attention and photocatalysts made of titanium oxide are in the market.

However, the photocatalytic activity shown by the photocatalysts made of titanium oxide available in the present market is not sufficient when the photocatalysts are irradiated with visible light.

SUMMARY OF THE INVENTION

The objects of the present invention is to provide a titanium oxide that shows sufficiently high photocatalytic activities by irradiation of visible light, to provide a photocatalyst using the titanium oxide as a catalyst component and to provide a photocatalyst coating composition using the titanium oxide.

The present inventors have studied on titanium oxide in order to achieve such objects. As a result, the present inventors have found that a specific titanium oxide shows sufficiently high photocatalytic activities by irradiation of visible light, and have completed the present invention.

Thus, the present invention provides a titanium oxide having (i) three or more peaks within the range of from 1.930 to 2.030 in g value of electron spin resonance spectrum of the titanium oxide, wherein the largest one of the peaks is within the range of from 1.990 to 2.020 in the g value and/or (ii) a spin concentration X of $1.50 \times 10^{16}$ spins/g or more, which is determined from electron spin resonance spectrum of the titanium oxide measured after irradiation of visible light.

The present invention also provides a photocatalyst containing the above-described titanium oxide as a catalyst component.

The invention further provides a photocatalyst coating composition comprising the above-described titanium oxide and a solvent.

DETAILED DESCRIPTION OF THE INVENTION

Figure 1:
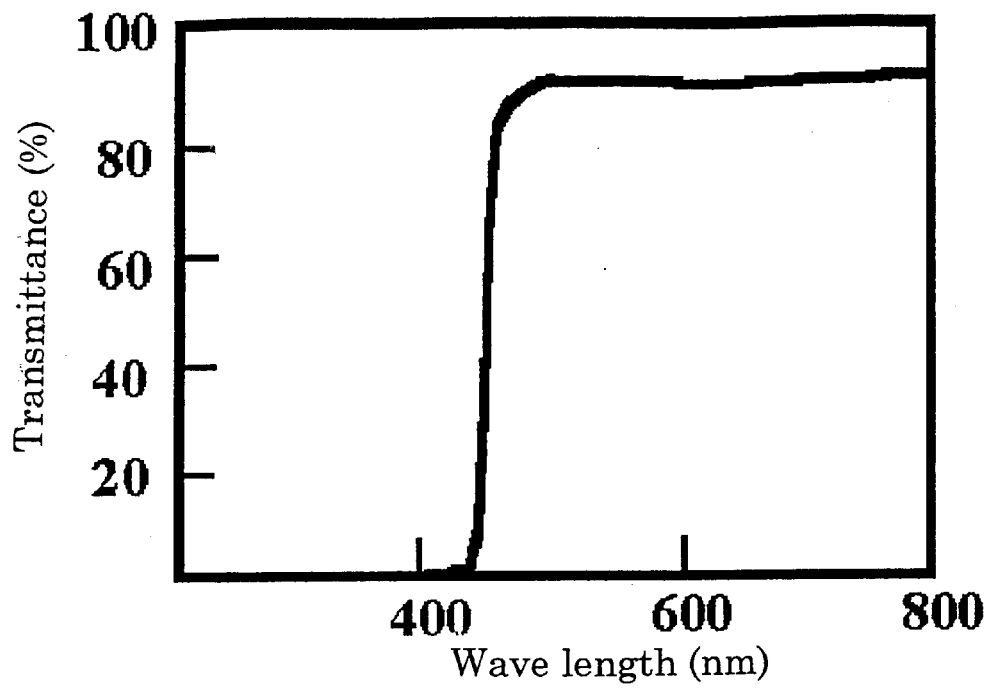
FIG. 1 is a wavelength-transmittance diagram showing spectral characteristics of an ultraviolet-cutting filter equipped with a light source used for visible light irradiation for calculation of spin concentration X and visible light irradiation for evaluation of photocatalytic activity of photocatalysts in Examples 2 and 3 and Comparative Examples 2 and 3.

Titanium oxide in the present invention has (i) three or more peaks within the range of from 1.930 to 2.030 in g value of its electron spin resonance spectrum (hereinafter, referred to as ESR spectrum), wherein the largest one of the peaks is within the range of from 1.990 to 2.020 in the g value and/or (ii) a spin concentration X of $1.50 \times 10^{16}$ spins/g or more, preferably $3.10 \times 10^{16}$ spins/g or more, which is determined from its ESR spectrum measured after irradiation of visible light.

The principle of ESR can be described as follows:

When unpaired electrons are placed in a magnetic field, energy level is divided due to the Zeeman effect. Supposing that the difference of the divided energies is represented by ΔE, when the electromagnetic field in a microwave range (frequency ν) satisfying the following formula (I):

$$\Delta E = h\nu \qquad (I)$$

(h: Plank constant $6.6255 \times 10^{-34}$ Js, ν: Microwave Frequency) is applied with changing intensity of the magnetic field, then a resonance absorption occurs in the case that the intensity H of the magnetic field satisfies the following formula (II):

$$h\nu = g\beta H \qquad (II)$$

and a peak appears in the resonance absorption curve which is obtained by plotting intensity of the magnetic field in abscissa and absorption of the electromagnetic field in ordinate. Based upon the position of the peak, a g value, which is an index representing the state of paired electrons, is obtained using the following formula (III) which is derived from the formula (II):

$$g = h\nu/(\beta H) \qquad (III)$$

(g: g value, β: Bohr magneton $9.274 \times 10^{-24}$ JT$^{-1}$, H: magnetic flux density).

In general, ESP spectrum is represented by a resonance absorption curve in a linear differential form, in order to improve the detection sensitivity.

A titanium oxide in the present invention may be examined whether or not it has three or more peaks within the range of from 1.930 to 2.030 in g value of its ESR and the largest one of the peaks is within the range of from 1.990 to 2.020 in the g value, for example, using the following method:

The ESR spectrum is measured while shielding from light. The measurement on the ESR spectrum of the titanium oxide may be carried out by using ESP-300 (manufactured by BRUKER JAPAN Co., Ltd.) under the following conditions, and a g-value of the titanium oxide is calculated by putting the magnetic flux density (H) obtained when a resonance absorption occurs into the formula (III).

Temperature: Room temperature
Pressure: Atmospheric pressure
Microwave Frequency: 9.47 GHz (=9.47×10$^9$ s$^{-1}$)
Center Field: 3400 G
Sweep Width: 500 G
Sweep Time: 83.885 s
Time Const.: 1310.72 ms
Mod. Amplitude: 5.054 G
Peak position detection: Corrected by using a g value of 2.0037 of 1,1'-diphenyl-2-picrylhydrazyl (hereinafter, referred to as DPPH) It is not clear why the titanium oxide in the preset invention shows a superior photocatalytic activity. However, since peaks located between 1.930 and 2.030 in g value of ESR spectrum are considered to be derived from radical groups containing nitrogen (atomic weight; 14), it is assumed that the photocatalytic activity has something to do with the existence of nitrogen and the distortion within the crystal lattice inside the titanium oxide due to the existence thereof.

In the present invention, the spin concentration X is calculated from an area between the range of from of 2.002 and 2.008 in g value of ESR spectrum measured after irradiating titanium oxide with visible light. The g value of from 2.002 to 2.008 corresponds to a magnetic flux density of from 3365 to 3375 G.

Figure 2:
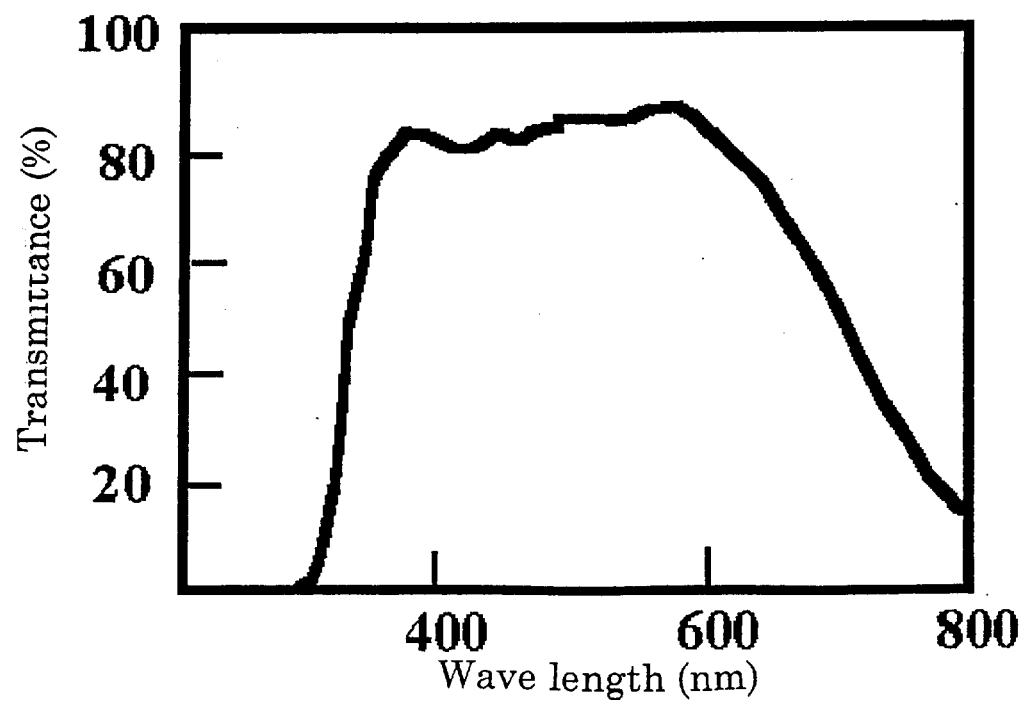
FIG. 2 is a wavelength-transmittance diagram showing spectral characteristics of an infrared-cutting filter equipped with a light source used for visible light irradiation for calculation of spin concentration X.

An ESR spectrum measurement for calculating the spin concentration X may be carried out, for example, under the same condition as exemplified above except that the ESR spectrum is measured while irradiating titanium oxide with visible light after the irradiation of visible light for one minute and that some conditions are changed as follows:

Sweep Time: 84 s
Time Const.: 20 ms
Mod. Amplitude: 2 G
Measuring Range: from 3150 to 3650 G
Integration Number: 5 times
Diameter of a measuring part of a Pyrex reaction tube for measurement: 2 mm
Peak position detection: Corrected by using DPPH The radiation of visible light for calculating the spin concentration X may be effected by using as a light source of a 500 W xenon lamp (trade name: Lamphouse UI-502Q, lamp: UXL-500D; lighting device: XB-50101AA-A; manufactured by Ushio Inc.) equipped with an ultraviolet-cutting filter (trade name: Y-45; manufactured by Toshiba Glass Co., Ltd.) which shows spectral characteristics illustrated in FIG. 1 and an infrared-cutting filter (trade name: IRA-25S; manufactured by Toshiba Glass Co., Ltd.) which shows spectral characteristics illustrated in FIG. 2.

The spin concentration X (spins/g) of titanium oxide is measured by comparing an ESR spectrum of the titanium oxide with that of a substance of which spin concentration is known.

One of the examples of the calculation, which should not be construed as a limitation upon the scope of the present invention, as follows.

Using 4-hydroxy-2,2,6,6-tetramethylpiperidine-1-oxyl (hereinafter, referred to as TEMPOL) as the substance of which spin concentration is known, a spin concentration of titanium oxide is measured by the following procedures from (1) to (6), according to the description of "Electron Spin Resonance", written by Hiroaki Ohya and Jun Yamauchi and published by Kodansha Scientific, p. 44.

(1) 0.00993 g of TEMPOL is dissolved in 20 ml of water to prepare an aqueous TEMPOL solution. A 1-ml portion of the obtained aqueous TEMPOL solution is diluted with water to prepare 50 ml of an aqueous solution (solution a1) and then a 5-ml portion of the aqueous solution a1 is diluted with water to prepare 10 ml of an aqueous solution (solution a2). Each ESR spectrum (in differential form) of the solutions a1 and a2 is respectively measured. These ESR spectra in differential form are converted into integral forms, to calculate the sizes of areas in the integral-form ESR spectra by a sectional measurement or the like. The area size $A_1$, which is in the ESR spectrum of the solution a1, turns out to be $1.178 \times 10^7$ and the area size $A_2$, which is in the ESR spectrum of the solution a2, turns out to be $4.614 \times 10^6$.

(2) A cell used for obtaining the ESR spectra has a diameter of 2 mm and a height of 2.5 cm and, therefore, the volume of the measurement region is $7.854 \times 10^{-5}$ L.

(3) The mol amount of TEMPOL in the measurement region is calculated to be $4.534 \times 10^{-9}$ mol from a TEMPOL concentration $9.930 \times 10^{-6}$ g/mL (=$5.773 \times 10^{-5}$ mol/L) in the solution a1 and the volume of the measuring region. Based on the fact that TEMPOL has one spin per molecule, a spin number (spin number $B_1$) of the solution a1 in the measurement region is calculated to be $2.731 \times 10^{15}$.

(4) The same manner as in (3) is conducted to obtain a spin number (spin number $B_2$) of the solution a2 is calculated to be $1.367 \times 10^{15}$.

(5) Assuming that a relationship between an area size A and a spin number B is shown with a straight line that coincides with the origin, the following equation (I) corresponding to such a straight line is provided based on the area sizes $A_1$ and $A_2$ obtained in (1) and the spin numbers $B_1$ and $B_2$ respectively obtained in (3) and (4).

$$B = 2.40 \times 10^8 \, A \quad (I)$$

(6) An ESR spectrum of titanium oxide is measured in differential form and then the ESR spectrum in the region of g value of from 2.002 to 2.008 is converted into the integral form, to calculate the size of area (area size C) in the integral-form ESR spectra. A spin concentration is calculated from the following equation (II):

$$\text{Spin concentration (spins/g)} = 2.40 \times 10^8 \times C/(D \times 2.5/E) \quad (II)$$

wherein C, D and E respectively represents an area size, a weight (g) of the titanium oxide and a length (cm) of a portion of the titanium oxide packed in the cell.

It is noted that a spin concentration Y is calculated from an area between the range of from 2.002 to 2.008 in g value of ESR spectrum measured with shielding from light. The titanium oxide in the present invention preferably has a spin concentration Y of $2.00 \times 10^{15}$ spins/g or more, more preferably has a spin concentration Y of $1.80 \times 10^{16}$ spins/g or more. Also, the titanium oxide in the present invention preferably has a ratio of the spin concentration X to the spin concentration Y (i.e. the spin concentration X/the spin concentration Y) of more than 1.00, more preferably of 1.15 or more. The measurement of the ESR spectrum and the calculation for obtaining the spin concentration Y are conducted in the same procedures as those for obtaining the spin concentration X described above except that the measurement of ESR spectrum is carried out while shielding from light.

It is preferred that the titanium oxide having a spin concentration X of $1.50 \times 10^{16}$ spins/g or more also has three or more peaks in the range of from 1.930 to 2.030 in g value (corresponding to the magnetic flux density of from 3329 to 3501 G) of ESR spectrum which is measured with shielding from light wherein the largest one of the peaks is within the range of from 1.990 to 2.020 in g value (corresponding to magnetic flux density of from 3345 to 3396 G). It is more preferred that the titanium oxide has three or more peaks in the range of from 1.976 to 2.029 in g value (corresponding to magnetic flux density of from 3330 to 3420 G) of ESR spectrum which is measured with shielding from light wherein the largest one of the peaks is within the range of from 1.999 to 2.008 in g value (corresponding to magnetic flux density of from 3365 to 3380 G).

Further, the titanium oxide having a spin concentration X of $1.50 \times 10^{16}$ spins/g or more preferably has a spin concentration Z of $3 \times 10^{16}$ spins/g or less, more preferably $1 \times 10^{16}$ spins/g or less, which is calculated from an area between the range of from 2.008 to 2.020 in g value (corresponding to magnetic flux density of from 3345 to 3365 G) of ESR spectrum measured with shielding from light. The measurement of the ESR spectrum and the calculation for obtaining the spin concentration Z are conducted in the same procedures as those for obtaining the spin concentration X described above except that the measurement of ESR spectrum is carried out while shielding from light and the range of g value used for the calculation is changed into the range of from 2.008 to 2.020.

The shape of the titanium oxide in the present invention may vary depending on how to use it and it is not limited. Examples of the shape may include powdery shape and fibrous shape. Other inorganic compound(s) may be mixed with the titanium oxide as long as the compound(s) does/do not give adverse effects to the photocatalytic activity of the titanium oxide. After the mixing, the resulting titanium oxide may be subjected to a heating treatment or the like so as to produce a composite product thereof. Examples of such other inorganic compound(s) may include silica ($SiO_2$), alumina ($Al_2O_3$), zirconia ($ZrO_2$), magnesia (MgO) and zinc oxide (ZnO).

The titanium oxide in the present invention can be produced, for example, by mixing an acid with a titanium compound, adding a base into the resulting mixture while cooling under stirring, and then carrying out washing and calcination. Examples of the acid to be used may include hydrochloric acid. Examples of the titanium compound to be used may include titanium trichloride, titanium tetrachloride, titanium sulfate, titanyl sulfate and titanium alkoxide. Examples of the base to be used may include ammonia or a substance that generates ammonia. Examples of the substance that generates ammonia may include amide compounds such as urea and formaldehyde, amidine compounds such as acetamidine, and amine compounds such as triethanolamine and hexamethylenetetramine. Alternatively, the titanium oxide in the present invention can be produced, for example, by calcining a titanium hydroxide such as a commercially available α-titanium hydroxides.

A photocatalyst in the present invention contains the above-described titanium oxide as a catalyst component.

The photocatalyst may include, for example, a sheet-shaped photocatalyst obtained by adding a molding assistant to particulate titanium oxide and then conducting an extrusion molding of the resulting mixture, a sheet-shaped photocatalyst obtained by entangling fibrous titanium oxide and organic fibers, and a photocatalyst obtained by applying titanium oxide to a metallic or resinous substrate or coating such a substrate with titanium oxide. Into the photocatalyst, may be added an inorganic compound other than titanium oxide, a polymer resin, a forming assistant, a binder, an antistatic agent and/or an adsorbent in order to improve mechanical strength and moldability of the photocatalyst. The inorganic compound to be used may include silica ($SiO_2$), alumina ($Al_2O_3$), zirconia ($ZrO_2$), magnesia (MgO), zinc oxide (ZnO) and titanium oxide that shows photocatalytic activity with ultraviolet irradiation.

Upon application of the photocatalyst, the photocatalyst may be put into a visible-light-transmitting glass container together with a liquid or gas to be treated and irradiated with visible light having a wavelength of 430 nm or more using a light source. The light source is not particularly limited as long as it can emit visible light having a wavelength of 430 nm or more. Example of the light source may include solar rays, a fluorescent lamp, a halogen lamp, a black light, a xenon lamp and a mercury arc lamp.

A photocatalyst coating composition in the present invention comprises the above-described titanium oxide and a solvent. The photocatalyst coating composition makes it possible to easily apply the titanium oxide onto various materials such as a construction material and an automobile material, to coat such various materials with the titanium oxide and to impart a high photocatalytic activity into such various materials. A preferable solvent comprised of the photocatalyst coating composition is a solvent which evaporates and does not remain with titanium oxide after the applying or coating of the composition. Examples of the solvent may include water, hydrochloric acid, alcohols and ketones.

The photocatalyst coating composition can be produced, for example, by a method in which titanium oxide is dispersed in water to obtain a slurry thereof or a method in which titanium oxide is peptized with an acid. Upon dispersion, a dispersing agent may be added thereto, if necessary.

As described above, the titanium oxide in the present invention exhibits a high photocatalytic activity by irradiation of visible light having a wavelength of 430 nm or more. Due to such photocatalytic activity of the titanium oxide, the photocatalyst in the present invention can effectively decompose alcohols such as propanol, while the photocatalyst may be the titanium oxide itself of the present invention. The photocatalyst coating composition in the present invention makes it possible to easily apply the titanium oxide onto various materials such as a construction material and an automobile material, to coat such various materials with the titanium oxide and to impart a high photocatalytic activity into such various materials.

When the photocatalyst in the present invention or the various materials coated with the photocatalyst coating composition in the present invention is placed in the environment where visible light enters, due to the photocatalytic activity of the titanium oxide therein, various organic materials such as an organic acid, for example, acetic acid are decomposed and removed, $NO_x$ or smell of cigarette in the atmosphere is decomposed, bad-smelling substances, molds or the like in a living or working space are decomposed and removed, environmental pollution substances in water such as organic solvents, agrochemicals and surfactants are decomposed and removed, and proliferation of bacteria such as ray fungi, algae, molds or the like is suppressed.

The titanium oxide, and the photocatalyst and the photocatalyst coating composition using the titanium oxide in the present invention are described in Japanese application nos. 11-310250, filed Oct. 29, 1999 and/or 12-47295, filed Feb. 24, 2000, the complete disclosures of which are incorporated herein by reference.

EXAMPLES

The present invention is described in more detail by following Examples, which should not be construed as a limitation upon the scope of the present invention.

Example 1

Figure 3:
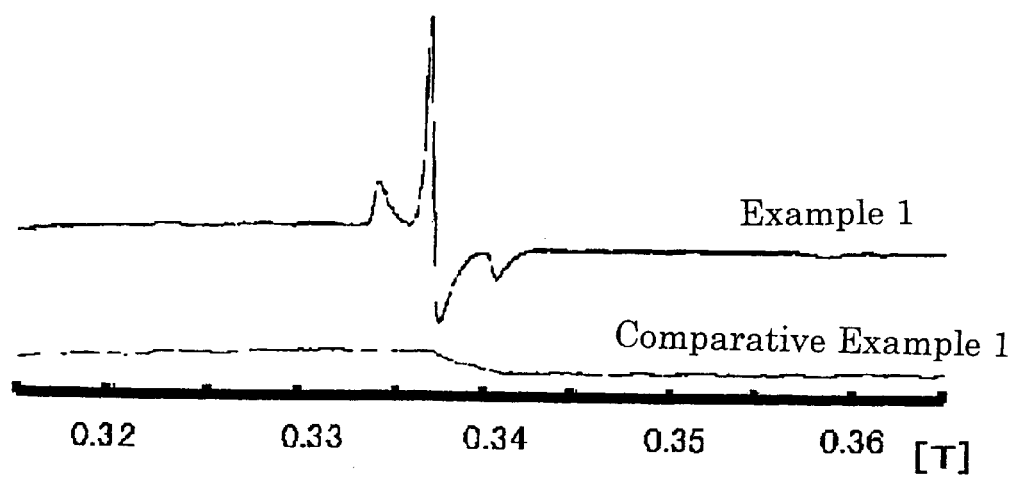
FIG. 3 shows the ESR spectra of titanium oxides obtained in Example 1 and Comparative Example 1.

Into a 300 ml flask, were put 110 g of a 0.5N aqueous hydrochloric acid solution and 25 g of titanium tetrachloride (Special grade, manufactured by Wako Pure Chemical Industries, Ltd.), and stirred under an atmosphere of nitrogen. To the resulting mixture, was added dropwise 146 g of a 25% ammonia water (Special grade, manufactured by Wako Pure Chemical Industries, Ltd.) over about 20 minutes with cooling with ice to perform hydrolysis. The obtained mixture was filtered off, washed and dried to obtain a dry cake. The dry cake was calcined in the air at 400° C. for one hour to obtain a particulate titanium oxide having a yellowish color. The ESR measurement of the titanium oxide was conducted. As a result, the ESR spectrum has g values of 2.023, 2.005 and 1.985. The ESR spectrum is shown in FIG. 3. According to Journal of the Physical Chemistry, 89, 5689–5694 (1985), peaks observed in the ESR spectrum are generated due to a radical group containing nitrogen (having an atomic weight of 14).

Figure 4:
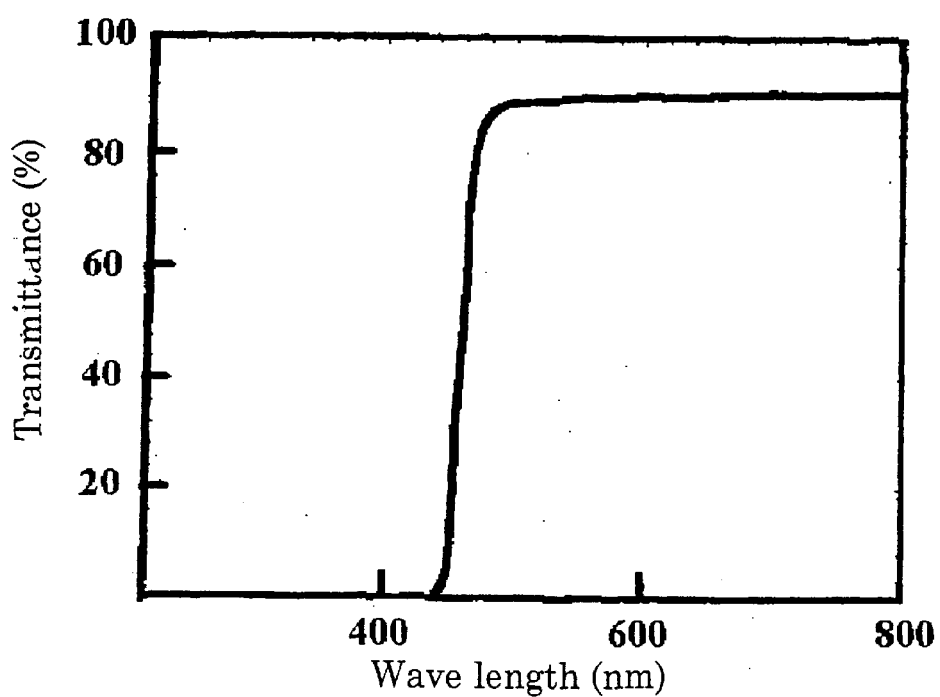
FIG. 4 is a wavelength-transmittance diagram showing spectral characteristics of an ultraviolet-cutting filter equipped with a light source used for visible light irradiation for evaluation of photocatalytic activity of photocatalysts in Example 1 and Comparative Example 1.

In a sealed-type glass reaction vessel made of Pyrex (diameter: 8 cm, height: 10 cm, volume: about 0.5 L), was placed a 5-cm diameter glass Petri dish on which 0.3 g of photocatalyst made only of the particulate yellowish titanium oxide obtained above. The reaction vessel was filled with a mixed gas having a volume ratio of oxygen to nitrogen of 1/4 (i.e. oxygen:nitrogen=1:4), sealed with 33 $\mu$mol of acetic acid and then irradiated with visible light having a wavelength of 430 nm or more. The photocatalytic activity of the photocatalyst was evaluated by measurement of a concentration of carbon dioxide, that is the oxidation decomposition product of acetic acid generated by the irradiation of visible light. The measurement of the carbon dioxide concentration was conducted using a gas chromatography (made by Shimadzu Corporation, column: Porapak Q, carrier gas: helium). The irradiation was carried out using a 500 W xenon lamp as the light source (made by USHIO INC., trade name; Lamphouse UI-502Q, lamp; UXL-500D, lighting device; XB-50101AA-A) equipped with an ultraviolet cutting filter (trade name: Y-45; manufactured by Toshiba Glass Co., Ltd.) having spectral characteristics shown in FIG. 4. A producing rate of carbon dioxide was 5.86 $\mu$mol/h per gram of the photocatalyst.

Comparative Example 1

The same processes as in Example 1 were carried out except that, instead of the photocatalyst made only of the yellowish particulat titanium oxide in Example 1, a commercially available product ST-01 (trade name) made by Ishihara Sangyo Kaisha, Ltd. was used as the photocatalyst. As a result, a producing rate of carbon dioxide was 0.46 $\mu$mol/h per gram of the photocatalyst. The ESR spectrum of ST-01 only has g value of 2.003. The ESR spectrum is shown in FIG. 3.

According to the decompositions of acetic acid to carbon dioxide shown in Example 1 and Comparative Example 1, it was found that, under the condition in that visible light having a wavelengths of 430 nm or more was irradiated to the photocatalyst, the titanium oxide of the present invention shows a higher decomposition function (photocatalytic activity) than that of commercially available photocatalyst made of titanium oxide.

Example 2

Figure 5:
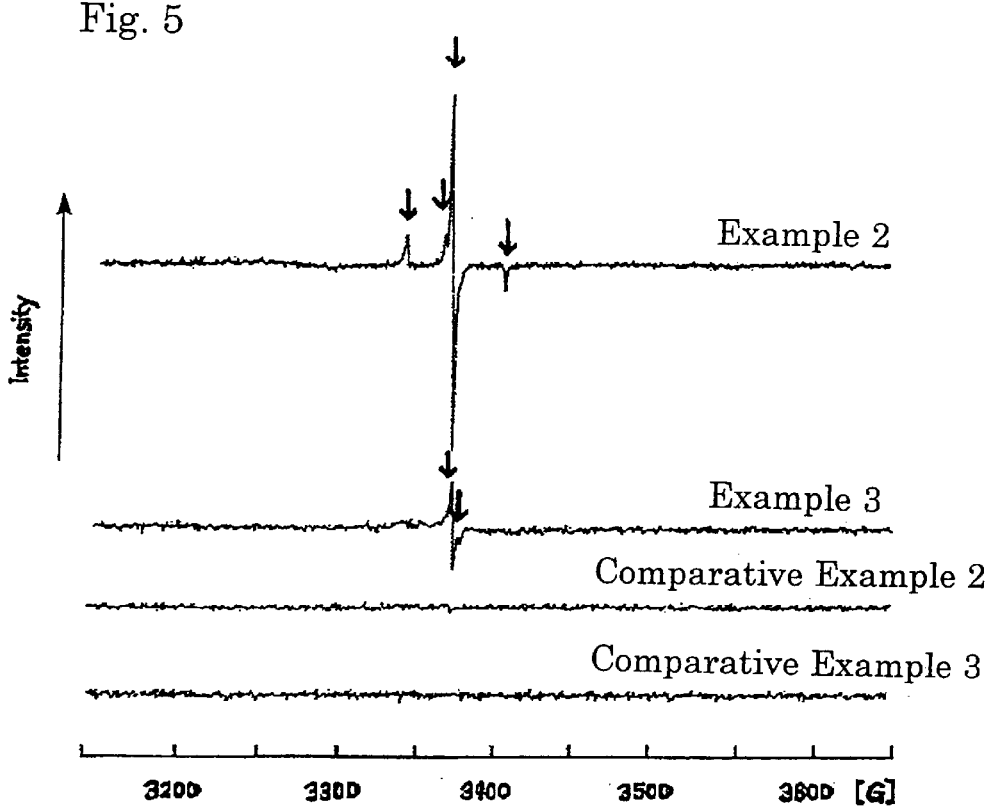
FIG. 5 shows the ESR spectra of titanium oxides obtained in Examples 2 and 3 and Comparative Examples 2 and 3.

Into a 1-L flask, was put 330 g of a 0.5 mol/L aqueous hydrochloric acid solution and then 75 g of titanium tetrachloride (Special grade, manufactured by Wako Pure Chemical Industries, Ltd.) was also put, and stirred at a rotation speed of 400 rpm. To the resulting mixture, was added dropwise 430 g of a 25% ammonia water (Special grade, manufactured by Wako Pure Chemical Industries, Ltd.) over about 45 minutes with cooling in an ice water to perform hydrolysis. The obtained mixture was filtered off, washed with being repulped with 60° C. water 30 times and dried at 70° C. to obtain a dry cake. The dry cake was calcined in the air at 350° C. for one hour to obtain a particulate titanium oxide. The ESR measurement of the titanium oxide was conducted. The results of the ESR measurement are shown in Table 1 and the ESR spectrum is shown in FIG. 5. The arrow signs in FIG. 5 indicate the positions of peaks of the spectrum.

Figure 6:
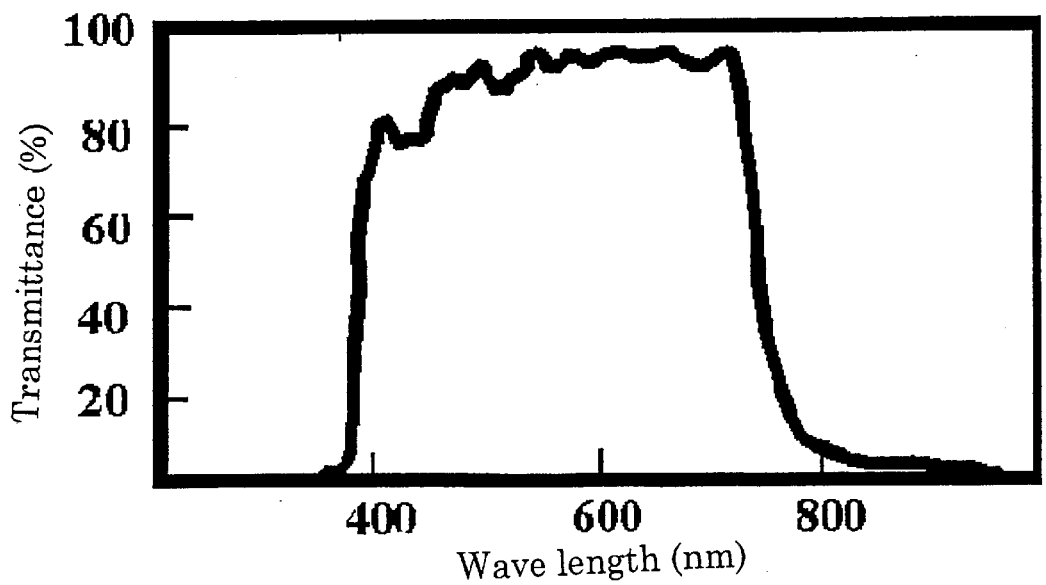
FIG. 6 is a wavelength-transmittance diagram showing spectral characteristics of an infrared-cutting filter equipped with a light source used for visible light irradiation for evaluation of photocatalytic activity of photocatalysts in Examples 2 and 3 and Comparative Examples 2 and 3.

In a sealed-type glass reaction vessel (diameter: 8 cm, height: 10 cm, volume: about 0.5 L), was placed a 5-cm diameter glass Petri dish on which 0.3 g of photocatalyst made only of the particulate titanium oxide obtained above. The reaction vessel was filled with a mixed gas having a volume ratio of oxygen to nitrogen of 1/4 (i.e. oxygen:nitrogen=1:4), sealed with 4.5 $\mu$mol of 2-propanol and then irradiated with visible light having a wavelength of 430 nm or more. The photocatalytic activity of the photocatalyst was evaluated by measurement of a concentration of carbon dioxide, that is the oxidation decomposition product of 2-propanol generated by the irradiation of visible light. The measurement of the carbon dioxide concentration was conducted using a photoacoustic multigas monitor (Model 1312, manufactured by INNOVA). A producing rate of carbon dioxide was 8.37 $\mu$mol/h per gram of the photocatalyst. The irradiation was carried out using a 500-W xenon lamp as a light source (trade name: Optical Modulex SX-UI500XQ, lamp: UXL-500SX, manufactured by USHIO Inc.) equipped with an ultraviolet-cutting filter (trade name: Y-45, manufactured by Toshiba Glass Co., Ltd.) which shows a spectral characteristic shown in FIG. 1 and an infrared-cutting filter (trade name: Super cold filter, manufactured by Ushio Inc.) which shows a spectral characteristic shown in FIG. 6.

A photocatalyst coating composition is prepared by dispersing the particulate titanium oxide obtained above, applied to a wall and dried, to uniformly form a titanium oxide layer on the surface of the wall.

Example 3

α-Titanium hydroxide (manufactured by Kishida Chemical Co., Ltd.) was calcined in the air at 400° C. for one hour to obtain particulate titanium oxide. The ESR measurements of the titanium oxide are shown in Table 1 and the ESR spectrum is shown in FIG. 5. The arrows in FIG. 5 indicate the positions of peaks. Using the titanium oxide, the photocatalytic activity of the photocatalyst was evaluated in the same manner as in Example 2. A producing rate of carbon dioxide was 1.41 $\mu$mol/h per gram of the photocatalyst.

Comparative Example 2

β-Titanium hydroxide (manufactured by Kishida Chemical Co., Ltd.) was calcined in the air at 400° C. for one hour to obtain particulate titanium oxide. The ESR measurements of the titanium oxide are shown in Table 1 and the ESR spectrum is shown in FIG. 5. The arrows in FIG. 5 indicate the positions of peaks. Using the titanium oxide, the photocatalytic activity of the photocatalyst was evaluated in the same manner as in Example 2. A producing rate of carbon dioxide was 0.00 μmol/h per gram of the photocatalyst.

Comparative Example 3

Using a commercially available titanium oxide (trade name: P-25, manufactured by Degussa) as a photocatalyst as it was, a photocatalytic activity of the photocatalyst was evaluated in the same manner as in Example 2. A producing rate of carbon dioxide was 0.52 μmol/h per gram of the photocatalyst. The ESR measurements of the resulting titanium oxide are shown in Table 1.

TABLE 1

|  | Example 2 | Example 3 | Comparative Example 2 | Comparative Example 3 |
|---|---|---|---|---|
| Spin concentration X (spins/g) | $4.26 \times 10^{16}$ | $2.46 \times 10^{16}$ | 0 | 0 |
| Spin concentration Y (spins/g) | $3.53 \times 10^{16}$ | $1.64 \times 10^{16}$ | 0 | 0 |
| Spin concentration ratio X/Y | 1.21 | 1.50 | — | — |
| The number of peaks appearing between 1.930 and 2.030 in g value | 4 | 2 | 0 | 0 |
| g value of the largest peak | 2.004 | 2.004 | — | — |
| Spin concentration Z (spins/g) | $0.00 \times 10^{16}$ | $1.96 \times 10^{16}$ | — | — |

What is claimed is:

1. A titanium oxide having
    a spin concentration X of $3.10 \times 10^{16}$ spins/g or more, which is determined from electron spin resonance spectrum of the titanium oxide measured after irradiation of visible light.
2. A titanium oxide according to claim 1, which has three or more peaks within the range of from 1.930 to 2.030 in g value of electron spin resonance spectrum of the titanium oxide, wherein the largest one of the peaks is within the range of from 1.990 to 2.020 in the g value.
3. A titanium oxide according to claim 1, which has a ratio (X/Y) of a spin concentration X to a spin concentration Y that is more than 1.00, the spin concentration X being determined from electron spin resonance spectrum of the titanium oxide measured after irradiation of visible light and the spin concentration Y being determined from electron spin resonance spectrum of the titanium oxide measured with shielding from light.
4. A titanium oxide according to claim 1 or 3, which has three or more peaks within the range of from 1.930 to 2.030 in g value of electron spin resonance spectrum of the titanium oxide, wherein the largest one of the peaks is within the range of from 1.990 to 2.020 in the g value.
5. A photocatalyst containing the titanium oxide as claimed in claim 1 as a catalyst component.
6. A photocatalyst coating composition comprising the titanium oxide as claimed in claim 1 and a solvent.

* * * * *